(12) United States Patent
Tyski

(10) Patent No.: US 7,429,143 B2
(45) Date of Patent: Sep. 30, 2008

(54) DETACHABLE FASTENING SYSTEM

(76) Inventor: Wlodzimierz M Tyski, 883 Borden Rd., Cheektowaga, NY (US) 14227

( * ) Notice: Subject to any disclaimer, the term of this patent is extended or adjusted under 35 U.S.C. 154(b) by 332 days.

(21) Appl. No.: 11/121,461

(22) Filed: May 4, 2005

(65) Prior Publication Data

US 2006/0251473 A1   Nov. 9, 2006

(51) Int. Cl.
   *F16D 1/00*   (2006.01)
(52) U.S. Cl. ............ 403/408.1; 24/104; 411/453; 411/458
(58) Field of Classification Search ........... 403/408.1; 24/453, 458, 488; 411/104, 522
   See application file for complete search history.

(56) References Cited

U.S. PATENT DOCUMENTS

| | | | | |
|---|---|---|---|---|
| 2,589,028 A | * | 3/1952 | Poupitch | 411/352 |
| 3,182,770 A | * | 5/1965 | Shemet | 403/408.1 |
| 3,271,059 A | * | 9/1966 | Pearson | 411/509 |
| 3,986,318 A | * | 10/1976 | McConnell | 403/384 |
| 5,174,675 A | * | 12/1992 | Martin | 403/4 |
| 5,206,999 A | * | 5/1993 | Stone | 30/372 |
| 6,126,355 A | * | 10/2000 | Clover, Jr. | 403/13 |
| 6,477,050 B1 | * | 11/2002 | Herring et al. | 361/704 |
| 6,485,223 B1 | * | 11/2002 | Van Schmus et al. | 403/408.1 |
| 6,754,992 B1 | * | 6/2004 | Byfield et al. | 52/36.5 |
| 6,918,712 B2 | * | 7/2005 | Boyce | 403/280 |
| 2002/0189058 A1 | * | 12/2002 | Budden et al. | 24/488 |

\* cited by examiner

*Primary Examiner*—Daniel P. Stodola
*Assistant Examiner*—Nahid Amiri

(57) ABSTRACT

An improved connector (15) for selectively joining two parts (16, 32), each of the parts having inner (18, 33) and outer (19, 34) surfaces and a keyhole opening (20, 35) between the inner and outer surfaces, each of the keyhole openings having first (21, 36) and second (22, 38) spaced enlargements and a slot (23, 39) extending between the first and second enlargements, comprising a body (48) having a first portion (49) configured to pass through the first enlargements but not to pass through the second enlargements, a second portion (50) configured to not pass through the second enlargements, and a third portion (51) configured to move in the slots between the first enlargements and the second enlargements, a member (58) in engagement with the body and moveable relative to the body between a first position (61) and a second position (62) and having a first portion (59) configured to move in the slots between the first enlargements and the second enlargements, and a second portion (60) configured to extend through the second enlargements but not to move in the slots, the body and member configured and arranged such that the first portion of the member and the third portion of the body are configured to move in the slots between the first enlargements and the second enlargements when the member is in the second position and the second portion of the member is configured to extend through the second enlargements but not to move in the slots when the member is in the first position.

32 Claims, 6 Drawing Sheets

Fig. 6A
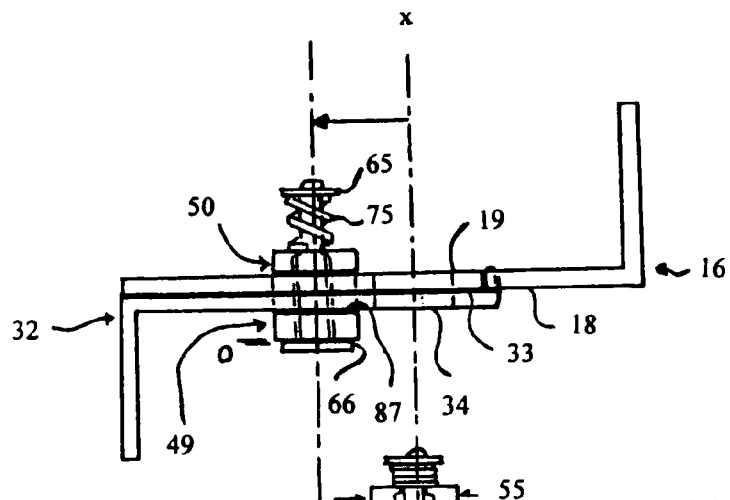
Fig. 6B
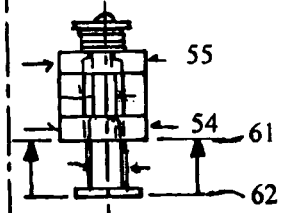
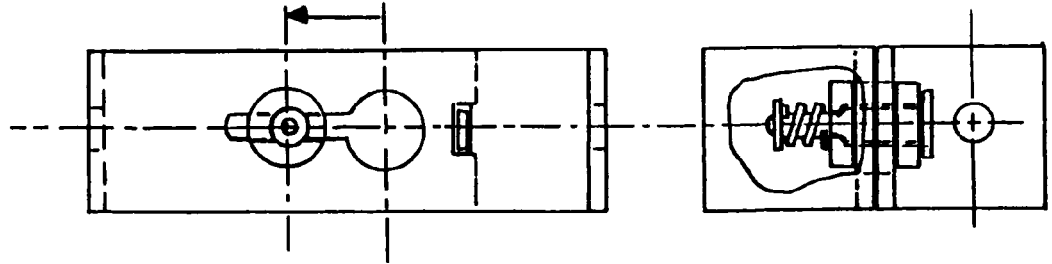
Fig. 6C

Fig. 7
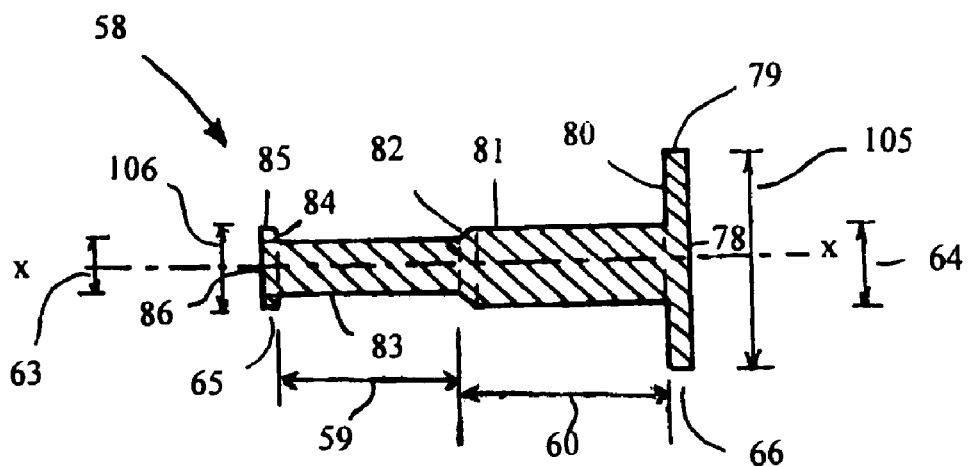
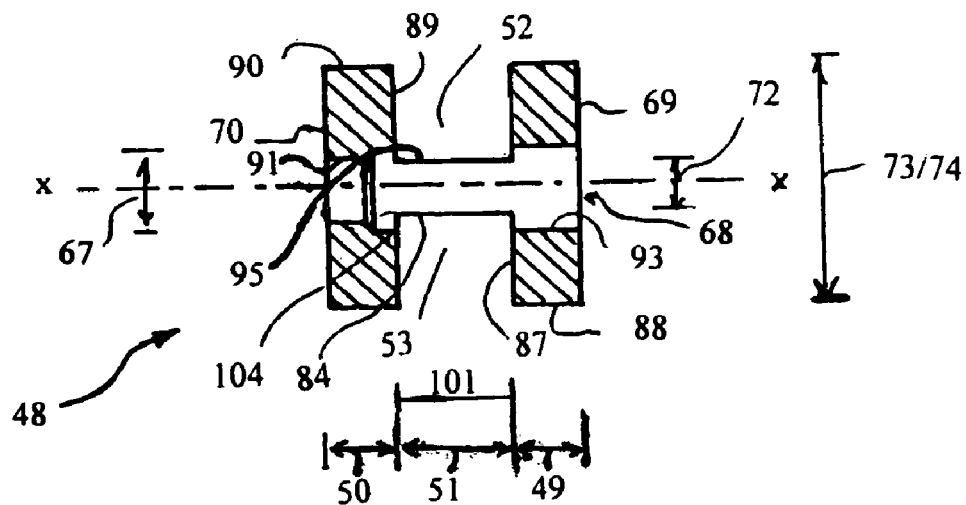
Fig. 8

DETACHABLE FASTENING SYSTEM

TECHNICAL FIELD

The present invention relates generally to the field of fastening systems and, more particularly, to an improved fastening system in which two parts may be fastened together in an easily detachable manner.

BACKGROUND ART

Fasteners for fixedly attaching two members are known in the prior art. For example, it is known that a threaded fastener may be used to attach storage shelves and other assemblies. However, such fasteners are not easily detachable and do not provide an assembly mechanism which may be used to adjustably assembly storage shelves, scaffolding and other structures in a temporary manner.

DISCLOSURE OF THE INVENTION

With parenthetical reference to the corresponding parts, portions or surfaces of the disclosed embodiment, merely for the purposes of illustration and not by way of limitation, the present invention provides an improved connector (15) for selectively joining two parts (16, 32), each of the parts having inner (18, 33) and outer (19, 34) surfaces and keyhole openings (20, 35) between the inner and outer surfaces, each of the keyhole openings having first (21, 36) and second (22, 38) spaced enlargements and slots (23, 39) extending between the first and second enlargements, comprising a body (48) having a first portion (49) configured to pass through the first enlargements but not to pass through the second enlargements, a second portion (50) configured to not pass through the second enlargements, and a third portion (51) configured to move in the slots between the first enlargements and the second enlargements, a member (58) in engagement with the body and moveable relative to the body between a first position (61) and a second position (62) and having a first portion (59) configured to move in the slots between the first enlargements and the second enlargements, and a second portion (60) configured to extend through the second enlargements but not to move in the slots, the body and member configured and arranged such that the first portion of the member and the third portion of the body are configured to move in the slots between the first enlargements and the second enlargements when the member is in the second position and the second portion of the member is configured to extend through the second enlargements but not to move in the slots when the member is in the first position.

The inner and outer surfaces of the parts may be parallel and planar. The first enlargement may be defined by a wall portion (24, 40) having an inwardly-facing cylindrical surface and the second enlargement may be defined by a wall portion (25, 41) having an inwardly-facing cylindrical surface and the diameter (29, 44) of the first enlargement may be greater than the diameter (30, 45) of the second enlargement. The slot may be defined by parallel wall portions (26/28, 42/43) and the slot may have a width (31, 46) less than the diameter of the second enlargements.

The body may have an axially extending throughbore (68) and the member may move in the bore between the first position and the second position. The first portion of the body may comprise an annular end face (69) and the second portion of the body may comprise an annular end face (70) and the third portion of the body may be a web defined by two recesses (52, 53) extending into the body between the first portion of the body and the second portion of the body and the web may have a width (72) slightly less than the width of the slot.

The first portion of the member may be cylindrical and have an outer diameter (63) and the second portion of the member may be cylindrical and have an outer diameter (64) and the diameter of the first portion may be less than the width of the slot and the diameter of the second portion may be greater than the width of the slot. The diameter of the second portion may be slightly less than the diameter of the second enlargement.

The connector may further comprise a spring (75) arranged between the body and the member to bias the member to the first position and the spring may be a coiled spring and a portion of the member may extend through the spring coaxially. The member have an end plate (65) and the second portion of the body may have an end face (70) and the spring may be between the end face and the end plate. The member may have a second end plate (66) and the first portion of the body may have an end face (69) and the second end plate of the member may be adjacent to the end face of the first portion of the body.

The member and body may be elongated along the same axis and the member may move axially between the first position and the second position relative to the body. The member and body may be in threaded engagement and selective rotation of the member relative to the body may cause axial movement of the member from the first position to the second position. The member and body may be elongated along the same axis and the member may rotate about the axis from the first position to the second position.

The present invention also discloses a connector for selectively joining two parts comprising a body (48) having a first portion (49) of a certain width (73) and a second portion (50) of a certain width (74) and a third portion (51) of a certain thickness (72), a member in engagement with the body and moveable relative to the body between a first position (61) and a second position (62) and having a first portion (59) of a certain width (63) and a second portion (60) of a certain width (64), the body and member configured and arranged such that the thickness of the third portion of the body is less than each of the widths of the first portion of the body, the second portion of the body and the second portion of the member, and the body and member configured and arranged such that the width of the second portion of the member is less than each of the widths of the first portion of the body and the second portion of the body, and the body and the member configured and arranged such that the width of the first portion of the member is less than the width of the second portion of the member and is less than or equal to the thickness of the third portion of the body.

The body may have an axially extending bore (68) and the member may move in the bore between the first position and the second position. The first portion of the body may comprise an annular end face (69) and the second portion of the body may comprise an annular end face (70) and the third portion of the body may be a web defined by two recesses (52, 53) extending into the body between the first portion of the body and the second portion of the body.

The first portion of the member may be cylindrical of a certain diameter (63) and the second portion of the member may be cylindrical of a certain diameter (64) and the diameter of the first portion may be less than the diameter of the second portion. The diameter of the first portion of the member may be less than or equal to the thickness of the third portion of the body and the diameter of the second portion of the member may be greater than the thickness of the third portion of the body.

The connector may comprise a spring (75) arranged between the body and the member to bias the member to the first position and the spring may be a coiled spring and the member may extend through the spring coaxially. The member may have an end plate (65), the second portion of the body may have an end face (70) and the spring may be between the end face and the end plate. The member may have a second end plate (66), the first portion of the body may have an end face (69) and the second end plate of the member may be adjacent to the end face of the first portion of the body when the member is in the first position.

The member and body may be elongated along the same axis and the member may move axially between the first position and the second position relative to the body. The member and the body may be in threaded engagement and selective rotation of the member relative to the body may cause axial movement of the member relative to the body from the first position to the second position. The member and the body may be elongated along the same axis and the member may rotate about the axis from the first position to the second position.

The present invention also discloses a method for selectively joining two parts comprising the steps of: providing a first part having an inner and outer surface and a keyhole opening between the inner and outer surfaces, the keyhole opening having first and second spaced enlargements and a slit extending between the first and second enlargements; providing a second part having an inner and outer surface and a keyhole opening between the inner and outer surfaces, the keyhole opening having first and second spaced enlargements and a slit extending between the first and second enlargements; providing a body having a first portion configured to pass through the first enlargements but not to pass through the second enlargements, a second portion configured to not pass through the second enlargements, and a third portion configured to move in the slits between the first enlargements and the second enlargements; providing a member in engagement with the body and moveable relative to the body between a first position and a second position and having a first portion configured to move in the slits between the first enlargements and the second enlargements and a second portion configured to extend through the second enlargements but not to move in the slits; aligning the keyhole opening of the first part with the keyhole opening of the second part; passing the first portion of the body through the first enlargements of the first and second parts; placing the member in the second position; moving the third portion of the body and the first portion of the member in the slot from the first enlargement to the second enlargement; and moving the member to the first position.

Accordingly, the general object of the present invention is to provide an improved connector for selectively joining two parts.

Another object is to provide an improved connector which may be easily disengaged to disconnect two parts that were previously connected.

Another object is to provide an improved connector which may be used with numerous different adjustable assemblies, such as storage shelves, scaffolds and other structures.

Another object is to provide an improved connector which may be used in heavy duty applications or in light load bearing applications.

Another object is to provide an improved connector which is spring loaded to a locked position.

These and other objects and advantages will become apparent from the foregoing and ongoing written specification, the drawings and the appended claims.

BRIEF DESCRIPTION OF THE DRAWINGS

FIGS. 6A-C are a schematic of the method for employing the fastening system shown in FIG. 1.

FIG. 7 is a vertical sectional view of the member shown in FIG. 2B.

FIG. 8 is a vertical sectional view of the body shown in FIG. 2B.

DESCRIPTION OF THE PREFERRED EMBODIMENTS

Figure 1:
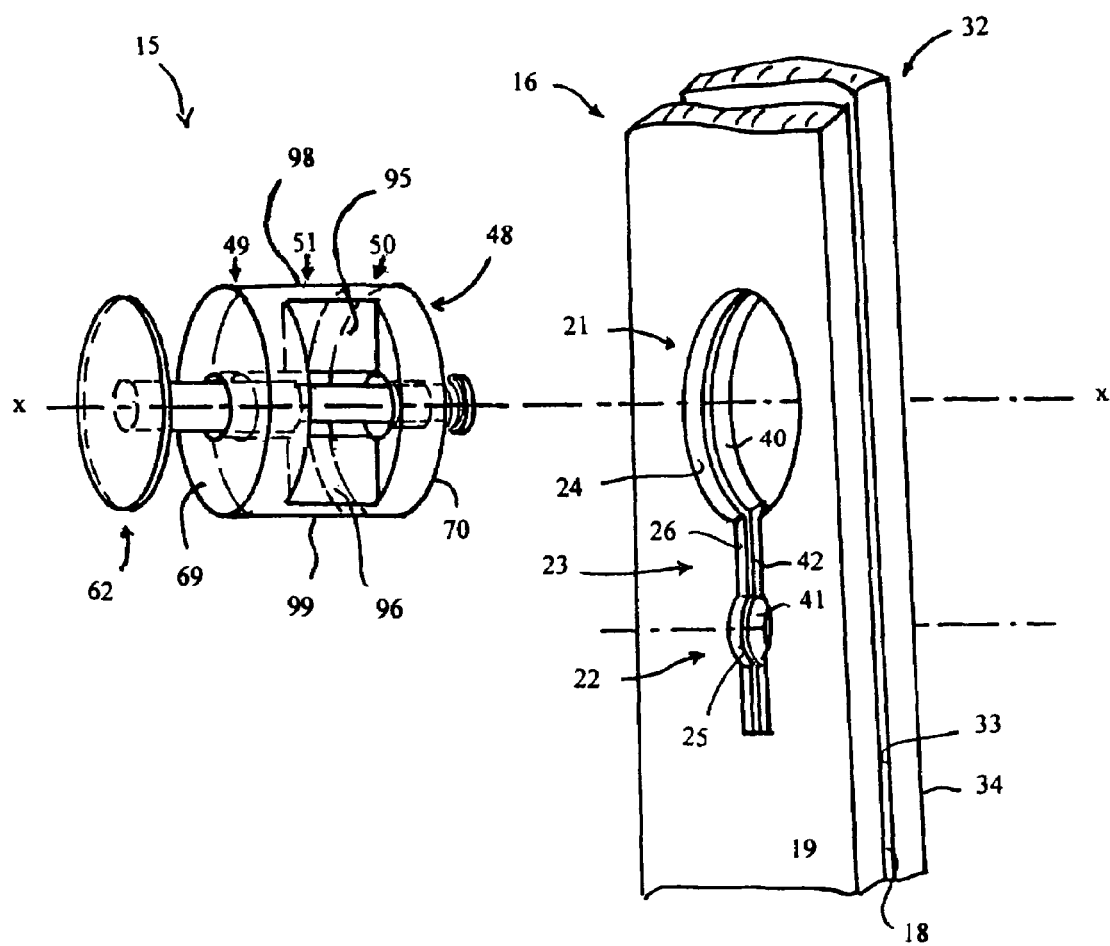
FIG. 1 is a left perspective view of the fastening system with the connector in a second position.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly"), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, the invention provides an improved connecting device, of which the presently preferred embodiment is generally indicated at 15. Connector 15 is adapt to be used to connect two specially-configured parts 16 and 32 and is shown as broadly including a body 48, a member 58 and a spring 75 acting between member 58 and body 48.

As shown in FIG. 7, member 58 is a specially-configured solid cylindrical member elongated along axis x-x, and is bounded by a rightwardly-facing annular vertical surface 78, an outwardly-facing horizontal cylindrical surface 79, a leftwardly-facing annular vertical surface 80, an outwardly-facing horizontal cylindrical surface 81, a leftwardly and outwardly-facing frusto-conical surface 82, an outwardly-facing horizontal cylindrical surface 83, a rightwardly-facing annular vertical surface 84, a outwardly-facing horizontal cylindrical surface 85, and a leftwardly-facing annular vertical surface 86.

Figure 2:
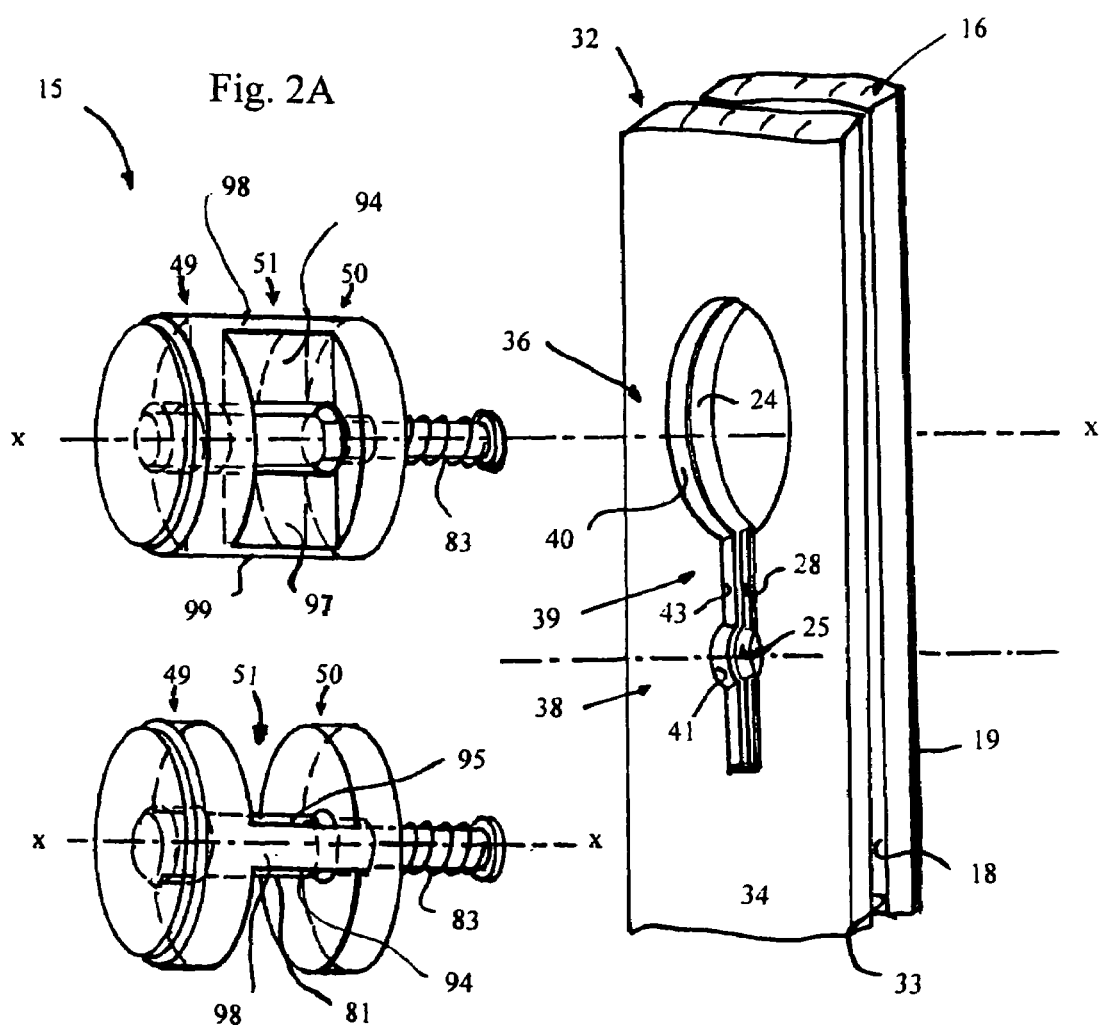
FIG. 2A is a right perspective view of the fastening system shown in FIG. 1 with the connector in a first position and on the other side of the parts relative to the connector shown in FIG. 1.
FIG. 2B is a perspective view of the connector shown in FIG. 2A rotated 90 degrees about the x-axis relative to the connector shown in FIG. 2A.

Referring now to FIG. 8, body 48 is a specially-configured solid member elongated along axis x-x and having a first portion 49, a second portion 50 and a third portion 51 extending between first portion 49 and second portion 50. First portion 49 is a cylindrical portion bounded by a rightwardly-facing annular vertical surface 69, an outwardly-facing horizontal cylindrical surface 88, a leftwardly-facing annular vertical surface 87 and a inwardly-facing horizontal cylindrical surface 93 joined at its right marginal end to the inner marginal end of surface 69. Second portion 50 is generally configured the same as first portion 49 and is generally bounded by a rightwardly-facing annular vertical surface 89, an outwardly-facing horizontal cylindrical surface 90, a leftwardly-facing annular vertical surface 70, an inwardly-facing horizontal cylindrical surface 91, and a rightwardly and inwardly-facing frusto-conical surface 104 joined at its right marginal end to the inner marginal end of surface 89. Third portion 51 is defined by cordial recesses 52 and 53 and has two radial sections that extend between surfaces 89 and 87. As shown in FIGS. 1, 2 and 2A, the first radial section has a horizontal planar surface 95, an outwardly-facing horizontal partial cylindrical surface 98, a horizontal planar surface 94 parallel to surface 95, and an inwardly-facing horizontal partial cylindrical surface 92. The left and right edges of the first radial section are formed to surfaces 87 and 89, respectively. The second radial section has a horizontal planar surface 96, an outwardly-facing horizontal partial cylindrical surface 99, a horizontal planar surface 97 parallel to surface 96, and an inwardly-facing horizontal partial cylindrical surface 100. The left and right edges of the second radial section are formed to surfaces 87 and 89, respectively, and the second radial section is oriented opposite to the first section.

Figure 9:
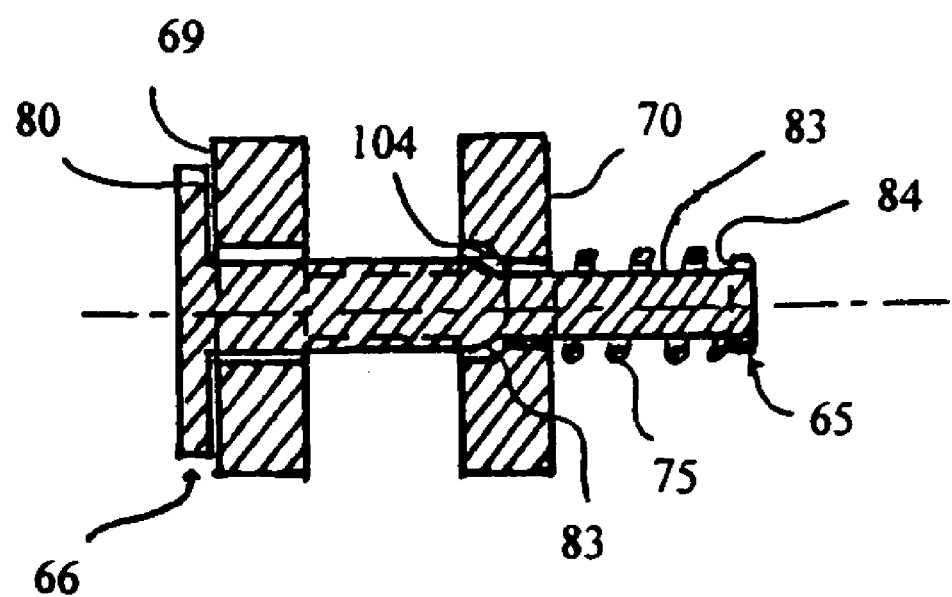
FIG. 9 is a vertical sectional view of the connector shown in FIG. 2B.

Surfaces 91, 104, 92/100 and 93 define throughbore 68. As shown in FIG. 9, surface 80 of member 58 is configured to abut against surface 69 of body 48. The inner diameter of surfaces 93 and 92/100 are just slightly larger than the diameter of surface 81. The inner diameter of surface 91 is just slightly larger than the diameter of surface 83. When in locked position 61, as shown in FIG. 9, surface 83 fits in the pocket defined by surface 104. Spring 75 is positioned around that portion of surface 83 that extends beyond surface 70 of body 48. Spring 75 is retained between surface 70 of body 48 and surface 84 of member 58.

Figure 3:
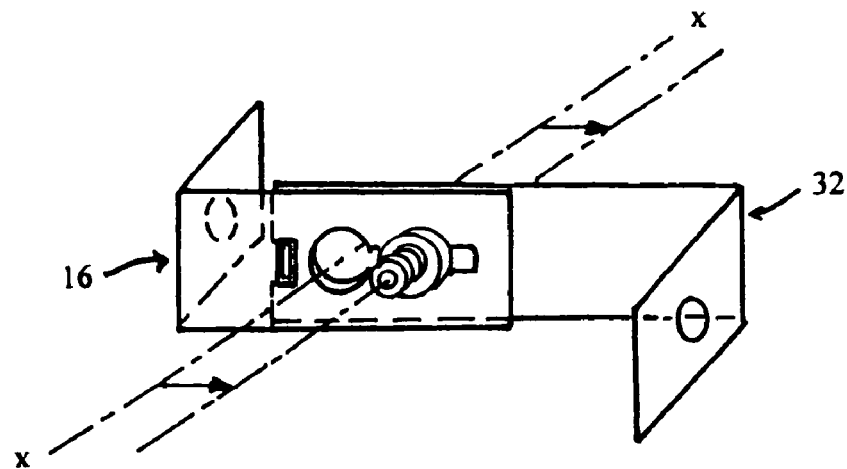
FIG. 3 is a prospective view of the fastening system shown in FIG. 1 with the parts rotated 90 degrees about axis x-x and the connector in a first locked position.
Figure 4:
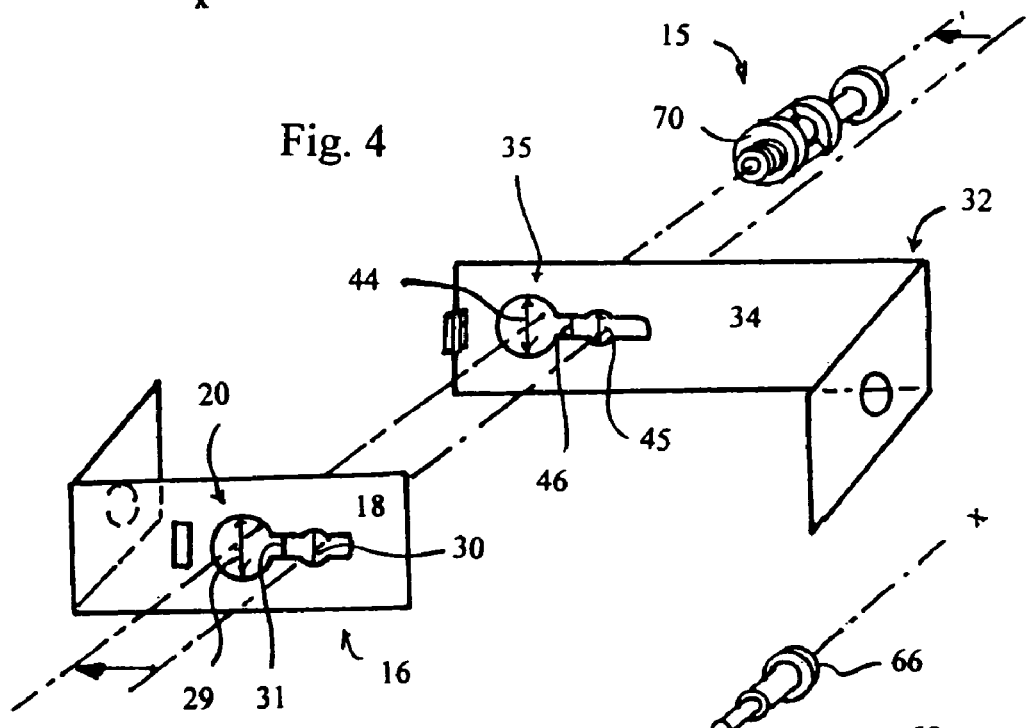
FIG. 4 is an exploded view of the fastening system shown in FIG. 3.
Figure 5:
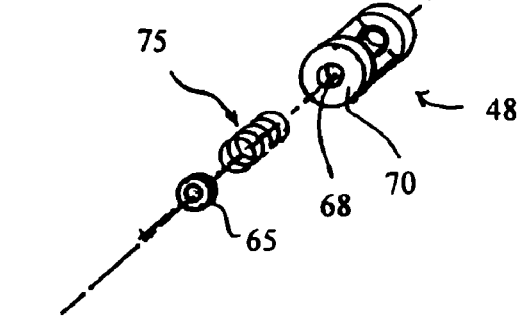
FIG. 5 is an exploded view of the connector shown in FIG. 4.

As shown in FIGS. 1-4, connector 15 is used to connect parts 16 and 32. Each of parts 16 and 32 have inner surfaces 18 and 33 and outer surfaces 19 and 34, respectively. Each part also has a keyhole opening 20 and 35, respectively. As shown, each keyhole opening has a first enlargement 21 and 36, a second enlargement 22 and 38, and a slot 23 and 39 extending between the first enlargement and the second enlargement, respectively. As shown in FIG. 4, first enlargements 21 and 36 are defined by a cylindrical inner surface 24 and 40 having an inner diameter 29 and 44, respectively. Second enlargements 22 and 41 are defined by an inner cylindrical surface 25 and 41 having an inner diameter 30 and 45, respectively. Slots 23 and 39 extend between the first and second enlargements and are defined by parallel walls 26/28 and 42/43, respectively. Slots 23 and 39 have a width 31 and 46, respectively.

As shown in FIG. 3, keyhole openings 20 and 35 are adapted so that they can be aligned, as shown in FIG. 3. As shown in FIG. 4, the diameter 29 and 44 of first enlargement 21 and 36 is greater than the diameter 30 and 45 of second enlargement 22 and 38, respectively. The width 31 and 46 of slot 23 and 39 are in turn smaller than the diameter 30 and 45 of second enlargement 22 and 38, respectively.

As shown in FIG. 7, first portion 59 of member 58 is defined by surface 83 and has a diameter 63. Second portion 60 of member 58 is defined by surfaces 81 and 82 and generally has an outer diameter 64. As shown in FIG. 8, end faces 69 and 70, together with surfaces 88 and 90, have an outside diameter 73/74. Web portion 51 has a thickness 72, which is the distance between parallel surfaces 94 and 95, and 96 and 97, respectively. Cylindrical surfaces 92/100 and 93 have an inner diameter 67.

In the preferred embodiment, the diameter 67 of surfaces 92/100 and 93 of bore 68 is slightly larger than the diameter 64 of portion 60 of member 58. The diameter 105 of end plate 66 and the diameter 106 of end plate 65 are larger than the largest outside diameter 67 of bore 68. Accordingly, member 58 slides axially inside bore 68 and is retained in this co-axial arrangement by surfaces 78 and 86 of end plates 66 and 65, respectively. Thickness 72 of web portion 51 is equal to the diameter 63 of portion 59 of member 58.

The outside diameter 73/74 of first and second portions 49, 50 of body 48 is slightly less than the inside diameter 29, 44 of first enlargements 21, 36 of parts 16, 32. However, the outside diameter 73/74 of first and second portions 49, 50 of body 48 is larger than the inside diameter 30, 45 of second enlargements 22, 38. Accordingly, the ends of member 48 will not slide through such second enlargements. The thickness 72 of portion 51 of body 48 and the diameter 63 of portion 59 of member 58 are just slightly less than the width 31, 46 of slots 23, 39 of parts 16, 32, respectively. Thus, in second position 62, when portion 59 is aligned with portion 51 as shown in FIG. 1, connector 15 can be moved through slots 23 and 39 between first enlargements 21, 36 and second enlargements 22, 39. The diameter 64 of portion 60 of member 58 is larger than the width 31,46 of slots 23, 39 of parts 16,32. Thus, in first position 61, when portion 60 is aligned with portion 51 as shown in FIGS. 2 and 9, connector 15 will not slide out of second enlargements 22, 38 by way of slots 23, 39.

The width 101 of third portion 51 is the distance between surfaces 89 and 87. In the preferred embodiment, the width 101 of web 51 is slightly greater than the combined thickness of parts 16 and 32, such that when engaged parts 16 and 32 are sandwiched between portions 49 and 50, and in particular the opposed surfaces 89 and 87 of body 48.

As shown in FIG. 6, connector 15 is used to detachably fasten parts 16 and 32 in a number of steps. First, inner surfaces 18 and 33 of parts 16 and 32 are pressed against each other and keyhole openings 20 and 35 of parts 16 and 32 are aligned. Next, the first portion 49 of body 48, together with end plate 66 of member 58 are inserted through first enlargements 21 and 36 of parts 16 and 32 until surface 87 of first portion 49 is just beyond outside surface 34 of part 32. Connector 15 is then rotated about axis x-x such that outer surfaces 94/96 and 95/97 of web 51 are parallel to and just inside of surfaces 26/28 and 42/43 of slots 23 and 39, respectively. Force is then applied to end plate 65 so as to compress spring 75 and move member 58 into second position 62. In second position 62, portion 59 of member 58 is aligned with web portion 51 such that all along width 101 of body 48 the thickness 63,72 of body 48 and member 58 is less than the width 31, 46 of slots 23, 39. The aligned third portion 51 of body 48 and the first portion 59 of member 58 are then moved in aligned slots 23, 39 from first enlargements 21, 36 to second enlargements 22, 38. The force against end plate 65 is then removed such that spring 75 expands and moves member 58 to a first locked position 61 relative to body 48. In this first position 61, portion 60 of member 58 is aligned with web portion 51 such that all along width 101 of body 48 the width 64 of portion 60 is greater than the width 31,46 of slots 23, 39. In this first position 61, connector 15 can not be moved out of second enlargements 22, 38, thereby locking parts 16 and 32 together. To unlock parts 16 and 32, force is applied against end plate 65 to compress spring 75 and move member 58 into second position 62. With portion 59 of member 58 aligned with web 51, connector 15 can then be moved in slots 23, 39 from second enlargements 22, 38 to first enlargements 21, 36. Once moved to first enlargements 21, 36, connector 15 can be withdrawn and parts 16 and 32 separated.

While in the preferred embodiment body 48 and member 58 are elongated along the same axis and member 58 moves axially between first position 61 and second position 62 relative to body 48, it is contemplated that other types of relative movement may be employed. For example, it is contemplated that the member and body may be in threaded engagement such that selective rotation of the member relative to the body may cause axially movement of the member relative to the body from a first position to a second position. Alternatively, it is contemplated that the member and body may be elongated along the same axis and the member may simply rotate about the axis from a first position to a second position without any relative axially movement between the member and the body. In addition, while a cylindrically shaped member and body have been shown and described, it is contemplated that other cross sectional geometries may be used, such as a polygonal cross section, for the member and/or body.

The present invention contemplates that many other changes and modifications may be made. Therefore, while the presently preferred form of the fastening system has been shown and described, and several modifications discussed, persons skilled in this art will readily appreciate that various additional changes and modifications may be made without departing from the spirit of the invention.

What is claimed is:

1. A connector assembly comprising:
    at least two parts, each of said parts having inner and outer surfaces and a key-hole opening between said inner and outer surfaces, each of said key-hole openings having first and second spaced enlargements and a slot extending between said first and second enlargements;
    a body having a first portion configured to pass through said first enlargements but to not pass through said second enlargements, a second portion configured to not pass through said second enlargements, and a third portion between said first portion and said second portion configured to move in said slots between said first enlargements and said second enlargements;
    a member in engagement with said body and axially moveable relative to said body between a first position and a second position and having a first portion configured to move in said slots between said first enlargements and said second enlargements and a second portion configured to extend through said second enlargements but to not move in said slots;
    said body and said member configured and arranged such that said first portion of said member and said third portion of said body are configured to move in said slots between said first enlargements and said second enlargements when said member is in said second position and said second portion of said member is configured to extend through said second enlargements but not to move in said slots when said member is in said first position.

2. The connector set forth in claim 1, wherein said inner and outer surfaces of said parts are parallel and planar.

3. The connector set forth in claim 1, wherein said first enlargement is defined by a wall portion having an inwardly-facing cylindrical surface.

4. The connector set forth in claim 1, wherein said second enlargement is defined by a wall portion having an inwardly-facing cylindrical surface.

5. The connector set forth in claim 1, wherein said first and second enlargements are defined by wail portions having inwardly facing cylindrical surfaces with inner diameters and said diameter of said first enlargement is greater than said diameter of said second enlargement.

6. The connector set forth in claim 5, wherein said slot is defined by parallel wall portions.

7. The connector set forth in claim 6, wherein said slot has a width less than said diameter of said second enlargement.

8. The connector set forth in claim 7, wherein said body has an axially extending bore and said member moves in said bore between said first position and said second position.

9. The connector set forth in claim 8, wherein said first portion of said body comprises a circular end face.

10. The connector set forth in claim 9, wherein said second portion of said body comprises a circular end face.

11. The connector set forth in claim 10, wherein said third portion of said body is a web defined by two recesses extending into said body between said first portion of said body and said second portion of said body.

12. The connector set forth in claim 11, wherein said web has a thickness slightly less than said width of said slot.

13. The connector set forth in claim 7, wherein said first portion of said member is cylindrical and has an outer diameter and said second portion of said member is cylindrical and has an outer diameter and said diameter of said first portion is less than said diameter of said second portion.

14. The connector set forth in claim 13, wherein said diameter of said first portion is less than said width of said slot and said diameter of said second portion is greater than said width of said slot.

15. The connector set forth in claim 14, wherein said diameter of said second portion is slightly less than said diameter of said second enlargement.

16. The connector set forth in claim 1, and further comprising a spring arranged between said body and said member to bias said member to said first position.

17. The connector set forth in claim 16, wherein said spring is a coiled spring and said member extends through said spring coaxially.

18. The connector set forth in claim 17, wherein said member has an end plate, said second portion of said body has an end face and said spring is arranged between said end face and said end plate.

19. The connector set forth in claim 18, wherein said member has a second end plate, said first portion of said body has an end face and said second end plate is adjacent to said end face of said first portion.

20. The connector set forth in claim 1, wherein said member and said body are elongated along the same axis and said member moves axially between said first position and said second position relative to said body.

21. The connector set forth in claim 1, wherein said member and said body are elongated along the same axis and said member rotates about said axis from said first position to said second position.

22. A connector for selectively joining two pans comprising:

a body having a first portion of a certain width, a second portion of a certain width and a third portion of a certain thickness between said first portion and said second portion;

said first portion of said body having an axially extending cylindrical bore of a certain diameter and said second portion of said body having an axially extending cylindrical bore of a certain diameter;

a member in engagement with said bores of said body and axially moveable relative to said body between a first position and a second position and having a first cylindrical portion of a certain diameter and a second cylindrical portion of a certain diameter;

said body and said member configured and arranged such that said thickness of said third portion of said body is less than each of said widths of said first portion of said body, said width of said second portion of said body and said diameter of said second portion of said member;

said body and said member configured and arranged such that said diameter of said second portion of said member is less than each of said widths of said first portion of said body said second portion of said body;

said body and said member configured and ranged such that said diameter of said second portion of said member is less than said diameter of said bore of said first portion of said body and said diameter of said first portion of said member is less than said diameter of said bore of said second portion of said body; and said body and said member configured and ranged such that said diameter of said first portion of said member is less than said diameter of said second portion of said member and is less than or equal to said thickness of said third portion of said body.

23. The connector set forth in claim 22, wherein said first portion of said body comprises a circular end face.

24. The connector set forth in claim 23, wherein said second portion of said body comprises a circular end face.

25. The connector set forth in claim 24, wherein said third portion of said body is a web defined by two recesses extending into said body between said first portion of said body and said second portion of said body.

26. The connector set forth in claim 22, wherein said diameter of said first portion of said member is less than said thickness of said third portion of said body.

27. The connector set forth in claim 22, and further comprising a spring arranged between said body and said member to bias said member to said first position.

28. The connector set forth in claim 27, wherein said spring is a coiled spring and said member extends through said spring coaxially.

29. The connector set forth in claim 27, wherein said member has an end plate, said second portion of said body has an end face and said spring is arranged between said end face and said end plate.

30. The connector set forth in claim 29, wherein said member has a second end plate, said first portion of said body has an end face and said second end plate of said member is adjacent to said end face of said first portion of said body when said member is in said first position.

31. The connector set forth in claim 22, wherein said member and said body are elongated along the same axis and said member moves axially between said first position and said second position relative to said body.

32. The connector set forth in claim 22, wherein said member and said body are elongated along the same axis and said member rotates about said axis from said first position to said second position.

* * * * *